（12）United States Patent
Zhong

(10) Patent No.: US 11,431,211 B2
(45) Date of Patent: Aug. 30, 2022

(54) ROTOR ASSEMBLY OF AN ELECTRIC MOTOR

(71) Applicant: Moog Inc., East Aurora, NY (US)

(72) Inventor: Ping Peter Zhong, Amherst, NY (US)

(73) Assignee: Moog Inc., East Aurora, NY (US)

( * ) Notice: Subject to any disclaimer, the term of this patent is extended or adjusted under 35 U.S.C. 154(b) by 195 days.

(21) Appl. No.: 16/781,483

(22) Filed: Feb. 4, 2020

(65) Prior Publication Data

US 2020/0177037 A1 Jun. 4, 2020

Related U.S. Application Data

(62) Division of application No. 15/436,322, filed on Feb. 17, 2017, now Pat. No. 10,581,285.

(Continued)

(51) Int. Cl.
*H02K 1/27* (2006.01)
*H02K 1/30* (2006.01)
(Continued)

(52) U.S. Cl.
CPC ........... *H02K 1/2706* (2013.01); *H02K 1/278* (2013.01); *H02K 1/30* (2013.01); *H02K 15/02* (2013.01); *H02K 15/03* (2013.01); *H02K 7/003* (2013.01)

(58) Field of Classification Search
CPC ........ H02K 1/2706; H02K 1/278; H02K 1/30; H02K 15/02; H02K 7/003; H02K 15/03
(Continued)

(56) References Cited

U.S. PATENT DOCUMENTS

| 1,279,591 A | * | 9/1918 | Sammarone | ........... H02K 15/12 310/265 |
| 4,477,744 A | | 10/1984 | Gerber | |

(Continued)

FOREIGN PATENT DOCUMENTS

| CN | 203301265 U | 11/2013 |
| CN | 204376566 U | 6/2015 |

(Continued)

OTHER PUBLICATIONS

CN 203 301 265 U (Hangzhou Ses Servo Motor Co Ltd), English translation, printed on Apr. 14, 2022.*

(Continued)

*Primary Examiner* — John K Kim
(74) *Attorney, Agent, or Firm* — Harter Secrest & Emery LLP

(57) ABSTRACT

A rotor assembly of an electric motor generally comprises a center shaft configured to rotate about a longitudinal axis and a plurality of spacers extending radially outward from the center shaft, the spacers fixedly attached to the center shaft. A plurality of axially stacked annular laminations are coaxially aligned with the center shaft and radially supported on an inner circumferential surface by the plurality of spacers. Each of the plurality of spacers has, at each axial end of the stacked annular laminations, first and second axial restraining elements extending in an outward radial direction beyond the inner circumferential surface of the plurality of stacked annular laminations. The plurality of stacked annular laminations are compressed between the first axial restraining element and the second axial restraining element, such that an axial compression force is applied to the plurality of stacked laminations.

14 Claims, 10 Drawing Sheets

Related U.S. Application Data

(60) Provisional application No. 62/297,714, filed on Feb. 19, 2016.

(51) Int. Cl.
*H02K 15/02* (2006.01)
*H02K 15/03* (2006.01)
*H02K 1/2706* (2022.01)
*H02K 1/278* (2022.01)
*H02K 7/00* (2006.01)

(58) Field of Classification Search
USPC ............................ 310/156.31; 29/596, 598
See application file for complete search history.

(56) References Cited

U.S. PATENT DOCUMENTS

| | | | |
|---|---|---|---|
| 5,528,095 | A | 6/1996 | Strobl |
| 5,898,990 | A | 5/1999 | Henry |
| 6,965,186 | B2 | 11/2005 | Fukuda et al. |
| 7,332,845 | B2 | 2/2008 | Heideman et al. |
| 7,348,704 | B2 | 3/2008 | Kim et al. |
| 7,768,168 | B2 | 8/2010 | Aschoff et al. |
| 8,004,140 | B2 | 8/2011 | Alexander et al. |
| 8,258,671 | B2 | 9/2012 | Hatch et al. |
| 8,745,848 | B2 | 6/2014 | Lang |
| 8,890,386 | B2 | 11/2014 | Morita et al. |
| 9,287,742 | B2 | 3/2016 | Reddy et al. |
| 10,581,285 | B2 * | 3/2020 | Zhong .................. H02K 1/2706 |
| 2002/0153802 | A1 * | 10/2002 | Kliman .............. H01H 36/0073 310/261.1 |
| 2005/0000083 | A1 * | 1/2005 | Edwards ............... F16D 1/0858 29/596 |
| 2006/0255679 | A1 | 11/2006 | Dine et al. |
| 2007/0103023 | A1 | 5/2007 | Tapper |
| 2007/0209860 | A1 | 9/2007 | Tsuji |
| 2008/0185935 | A1 | 8/2008 | Seiler |
| 2009/0026877 | A1 | 1/2009 | Alfermann et al. |
| 2010/0243197 | A1 * | 9/2010 | Osborne ................ H02K 15/02 164/520 |
| 2017/0244292 | A1 * | 8/2017 | Zhong .................... H02K 1/278 |
| 2020/0177037 | A1 * | 6/2020 | Zhong .................... H02K 1/278 |

FOREIGN PATENT DOCUMENTS

| | | |
|---|---|---|
| EP | 0786854 A1 | 7/1997 |
| GB | 2151084 A | 7/1985 |
| JP | S56000908 U | 1/1981 |
| JP | S56049640 A | 5/1981 |
| JP | S5768636 A | 4/1982 |
| JP | H03143250 A | 6/1991 |
| JP | 05161288 | 6/1993 |
| WO | 2007074209 A1 | 7/2007 |

OTHER PUBLICATIONS

U.S. Patent and Trademark Office (ISA/US), International Search Report and Written Opinion from corresponding PCT International Application No. PCT/US2017/018449, dated May 11, 2011.
European Patent Office (EPO), Communication pursuant to Article 94(3) EPC from European Patent Application No. 17 708 121.3 dated Nov. 25, 2019.

* cited by examiner

ROTOR ASSEMBLY OF AN ELECTRIC MOTOR

TECHNICAL FIELD

This disclosure relates to electric motors, and particularly to a rotor assembly for a rotary electric magnetic motor.

BACKGROUND ART

There are various geometries for magnetic electric motors. One geometry is the linear magnetic motor. In a linear magnetic motor, a shaft is driven to move linearly (that is, as a straight line translation) with respect to a stator. Another geometry is a rotary magnetic motor. In a rotary magnetic motor, a rotor is driven to rotate relative to a stator.

Conventional rotary electric magnetic motors generally include a stator assembly and a rotor that is driven to rotate with respect to the stator assembly. Typically, the rotor is at least partially surrounded by the stator and the rotor generates a magnetic field by virtue of having a series of built in permanent magnets. The stator generates magnetic fields through a series of coils or windings. By timing the flow of current in the coils with respect to the position and/or momentum of the rotor, the interaction of magnetic forces from the rotor and from the stator will rotate the rotor.

Thus, in magnetic motors, magnetic fields are formed in both the rotor and the stator. The product between these two fields gives rise to a force, and thus a torque on the motor rotor or shaft. The rotor thereby moves through the field of the stator due to magnetic forces generated by energized coils in the stator. Thus, a conventional electric motor includes a generally cylindrical outer stator core, stator coils wound within the stator core, and an inner rotor having permanent magnets and that moves relative to the stator core so as to provide motion by means of interaction with the magnetic field of the stator.

The stator conventionally includes at least one coil wound in at least one stator core. The purpose of the stator coils is to generate magnetic flux that interacts with permanent magnets on the rotor. Various stator assembly configurations are known. The stator may be built by stacking module parts, or may be formed from radially-extending laminates, as well as by other methods. The stator core is typically made up of many thin metal sheets, called laminations. Laminations are used to reduce energy losses that would result if a solid core were used.

SUMMARY

With parenthetical reference to the corresponding parts, portions or surfaces of the disclosed embodiment, merely for the purposes of illustration and not by way of limitation, a rotor assembly (15) of an electric motor is provided comprising a center shaft (16) configured to rotate about a longitudinal axis (x-x). Extending radially outward from the center shaft are a plurality of spacers (20a-20f). Each of the plurality of spacers are fixedly attached to the center shaft along an axially extending proximal edge (21) of the spacer. An axially extending distal edge (22) of at least one of the plurality of spacers has an axially extending first coupling element (23). A plurality of axially stacked annular laminations (31) are coaxially aligned with the center shaft and are radially supported by the plurality of spacers. Thus, a plurality of voids (26) are created and defined between two spacers, the center shaft, and the lamination stack. Each of the plurality of stacked annular laminations has a second coupling element (32) formed within an inner circumferential surface (33) of each individual lamination (30). The first coupling element of the spacer is configured to mechanically engage the second coupling element of the stacked annular laminations, wherein rotational movement of the plurality of stacked annular laminations about the longitudinal axis (x-x), relative to the center shaft, is restrained.

The plurality of spacers may comprise axially elongated radial spokes welded to the center shaft, and the plurality of spacers may form a single unitary structure with the center shaft. The spacers may be circumferentially spaced symmetrically around the center shaft.

The first coupling element may comprise an axially elongated protrusion or groove, while the second coupling element may comprise the other of a protrusion or a groove configured to mate with the first coupling element. The distal edge of at least two of the plurality of spacers may each have axially extending first coupling portions, and each of the plurality of stacked annular laminations may have a plurality of second coupling portions configured to engage with the at least two first coupling portions.

The disclosed stacked annular laminations may be in direct contact with the spacers, and may be shrink fit to the spacers. The stacked annular laminations may be configured such that an inward radial compression force (61) is applied against the spacers. Each of the stacked annular laminations may be joined together by this inward radial compression force, such that an external bonding agent is not used or needed to join together each of the individual annular laminations of the lamination stack.

Each of the plurality of spacers may have on the distal axial edge and at a first end (38) of the stacked annular laminations, a first axial restraining element (40) extending in an outward radial direction beyond the inner circumferential surface of the plurality of stacked annular laminations. A first annular end plate (41) may be coaxially aligned with the center shaft and positioned axially between a first end annular lamination of the stacked annular laminations and the first axial restraining element. Each of the plurality of spacers may further have, on the distal axial edge and at a second opposing end (39) of the stacked annular laminations, a second axial restraining element (42) extending in an outward radial direction beyond the inner circumferential surface of the stacked annular laminations. A second annular end plate (43) may be coaxially aligned with the center shaft and positioned axially between a second end annular lamination of the stacked annular laminations and the second axial restraining element, and the plurality of stacked annular laminations may then be compressed between the first annular end plate and the second annular end plate, such that an axial compression force (60) is applied to the plurality of stacked laminations. Each annular end plate may contain a plurality of mounting holes (48) for optionally attaching one or more balancing weights (46).

The first axial restraining element may comprise a transversely extending recess (24) having a recess entrance (25) on the distal edge of at least one of the spacers and a restraining key (50) partially supported in the recess and extending in an outward radial direction beyond the recess entrance and the inner circumferential surface of the stacked annular laminations. The restraining key may have a length and a thickness that varies with the length such that the axial compression force of the plurality of stacked laminations can be selectively varied as a function of the length of the restraining key supported in the recess. The second axial restraining element may comprise a restraining tab extending from at least one of the spacers in an outward radial direction beyond the inner circumferential surface of the stacked annular laminations.

The rotor assembly may further comprise a plurality of segmented magnets (54) attached to an outer circumferential surface (37) of the stacked annular laminations. The plurality of segmented magnets may be glued to the outer surface of the plurality of stacked annular laminations, and may be further secured to the plurality of stacked annular laminations by an outer band (55) wrapped circumferentially around the segmented magnets. Each individual annular lamination may have a series of alternating protrusions (34), forming slots (36) around the outer circumferential surface (37) of the annular lamination, such that when the plurality of annular laminations are stacked over the spacers, the plurality of lamination protrusions and slots line up to form a plurality of magnet channels, within which each segmented magnet will be fixedly attached.

In another aspect, a rotor assembly of an electric motor is provided comprising a center shaft configured to rotate about a longitudinal axis and a plurality of spacers extending radially outward from the center shaft. Each of the plurality of spacers is fixedly attached to the center shaft along an axially extending proximal edge of the spacer. A plurality of axially stacked annular laminations are coaxially aligned with the center shaft and radially supported on an inner circumferential surface by the plurality of spacers. Each of the plurality of spacers has, at a first axial end of the stacked annular laminations, a first axial restraining element extending in an outward radial direction beyond the inner circumferential surface of the plurality of stacked annular laminations. Further, each of the plurality of spacers has, at a second axial end of the stacked annular laminations, a second axial restraining element extending in an outward radial direction beyond the inner circumferential surface of the stacked annular laminations, and the plurality of stacked annular laminations are compressed between the first axial restraining element and the second axial restraining element, such that an axial compression force is applied to the plurality of stacked laminations.

The rotor assembly may further comprise a first annular end plate coaxially aligned with the center shaft and positioned axially between a first end annular lamination of the stacked annular laminations and the first axial restraining element, and a second annular end plate coaxially aligned with the center shaft and positioned axially between a second end annular lamination of the stacked annular laminations and the second axial restraining element. The plurality of stacked annular laminations may be compressed between the first annular end plate and the second annular end plate, such that an axial compression force is applied to the plurality of stacked laminations. Each of the stacked annular laminations may be joined together by the axial compression force, such that an external bonding agent is not used to join together each of the stacked annular laminations.

The first axial restraining element may comprise a transversely extending recess having a recess entrance in the distal edge of at least one of the spacers, and a restraining key partially supported in the recess and extending in an outward radial direction beyond the recess entrance and the inner circumferential surface of the stacked annular laminations. The restraining key may have a length and a thickness that varies with the length such that the axial compression force of the plurality of stacked laminations can be selectively varied as a function of the length of the restraining key extending into the recess. The second axial restraining element may comprise a restraining tab extending from at least one of the spacers in an outward radial direction beyond the inner circumferential surface of the stacked annular laminations.

The distal edge of at least one of the plurality of spacers may have an axially extending first coupling element, and each of the plurality of stacked annular laminations may have a second coupling element formed within the inner circumferential surface of the lamination. The first coupling element of the spacer may be configured to mechanically engage the second coupling element of the stacked annular laminations, wherein rotational movement of the plurality of stacked annual laminations about the longitudinal axis relative to the center shaft is restrained.

The spacers may be welded to the center shaft such that the spacers and the center shaft are bonded together to form a single unitary structure, and the spacers may be circumferentially spaced symmetrically around the center shaft.

The first coupling element may have an axially elongated protrusion or groove, with the second coupling element having the other of a protrusion or a groove configured to mate with the first coupling element.

The stacked annular laminations may be shrink fit to and in direct contact with the spacers, wherein the stacked annular laminations are configured such that an inward radial compression force is applied against the spacers. A plurality of segmented magnets may be fixedly attached to an outer surface of the stacked annular laminations, and the plurality of segmented magnets may be further secured to the outer surface of the stacked annular laminations by an outer band wrapped circumferentially around the segmented magnets.

In another aspect a method of fabricating a rotor assembly of an electric motor is provided. A center shaft having a first end and an opposing second end is provided, the center shaft configured to rotate about a longitudinal axis. A plurality of spacers are fixedly attached to the center shaft along axially extending proximal edges of the plurality of spacers, such that the spacers extend radially outward from the center shaft. An axially extending distal edge of at least one of the spacers is provided with an axially extending first coupling element. A plurality of annular laminations are provided, each of the annular laminations further provided with a second coupling element formed within an inner cylindrical surface of the annular lamination. A first axial restraining element is provided on the axially extending distal edge of the spacers and proximate the first end of the center shaft. The first axial restraining element is provided extending in an outward radial direction beyond an inner circumferential surface of the plurality of annular laminations. A first annular end plate is placed over the spacers, the first annular end plate aligned coaxially with the center shaft. The annular laminations are heated, and then, after the placing of the first annular end plate, the heated annular laminations are axially stacked over the spacers such that the annular laminations are coaxially aligned with the center shaft. The first coupling element of the spacer is engaged with the second coupling element of the annular laminations such that rotational movement of the stacked annular laminations about the longitudinal axis relative to the center shaft is restrained. After the stacking of the heated annular laminations, a second annular end plate is placed over the spacers. After the placing of the second annular end plate, the stacked annular laminations are axially compressed between the first annular end plate and the second annular end plate, such that an axial compression force is applied to the stacked annular laminations. A second axial restraining element is provided, extending in an outward radial direction beyond the inner circumferential surface of the stacked annular laminations, and the second axial restraining element is engaged with the second annular end plate such that the axial compression force applied to the stacked annular laminations is maintained.

DESCRIPTION OF THE PREFERRED EMBODIMENTS

Figure 1:
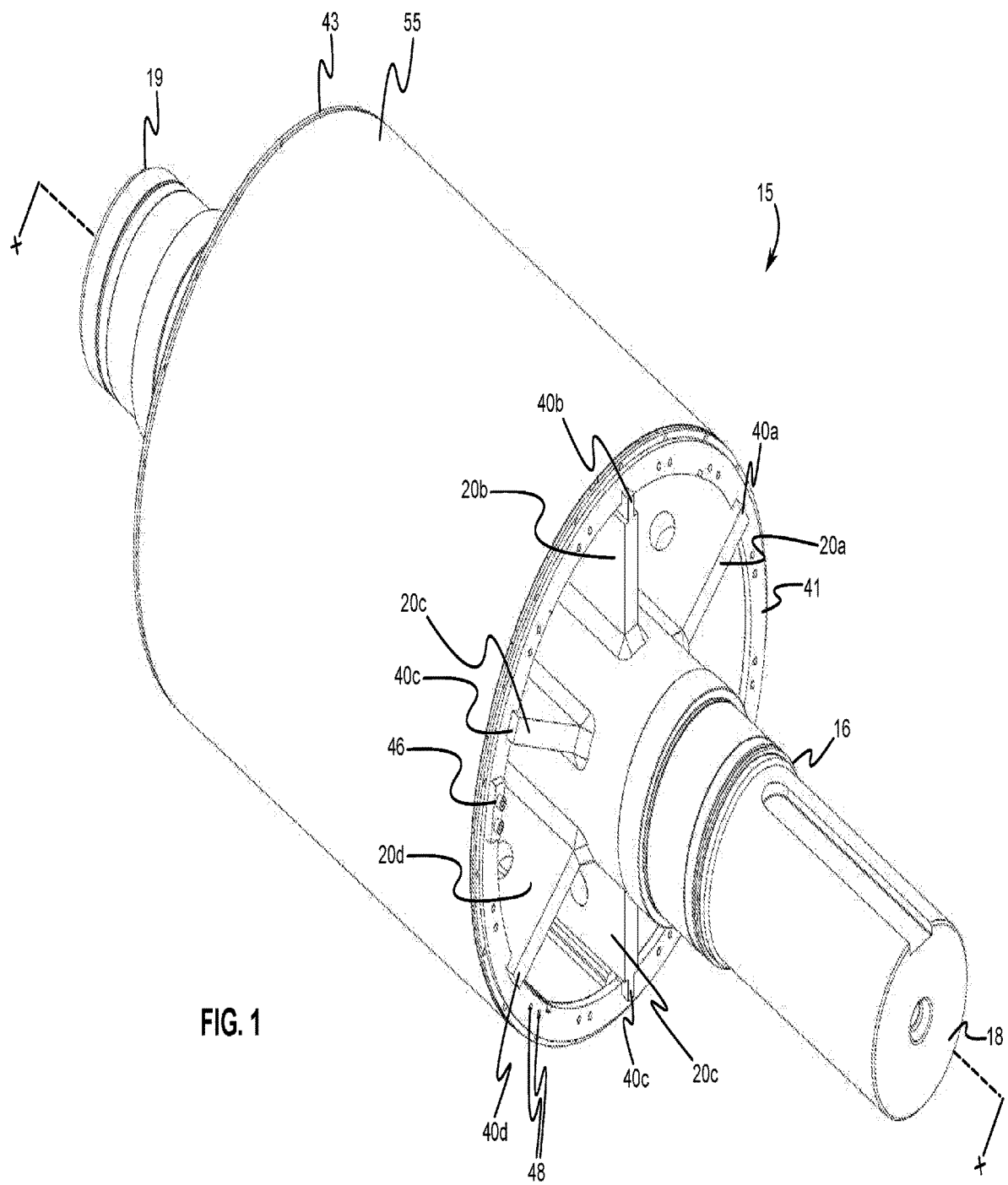
FIG. 1 is a perspective view showing a rotor assembly of an electric motor according to a first embodiment.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The instant disclosure is directed to a rotor design that reduces material requirements, rotor weight and operational inertia as compared with previous rotor designs, while maintaining required structural integrity. Referring now to the drawings, and more particularly to FIG. 1 thereof, an improved rotor assembly is provided, of which a first embodiment is generally indicated at 15. As will be described below, rotor assembly 15 generally comprises a center shaft 16 oriented about longitudinal axis x-x, a plurality of radially-extending spacers in the form of ribs or spokes 20a-20f, a laminated cylindrical back iron rotor stack 31 supported by spacers 20a-20f and coaxially aligned with center shaft 16, and annular end plates 41, 43 having the same inner diameter as the inner diameter of laminated stack 31 and also coaxially aligned with center shaft 16.

FIG. 1 illustrates rotor assembly 15 fully assembled. Rotor assembly 15 includes a center shaft 16 having a first end 18 and an opposing second end 19, and center shaft 16 is configured to rotate about a longitudinal axis x-x. Fixedly attached to center shaft 16 are plurality of spacers 20a-20f, which extend radially outward from center shaft 16. Outer band 55 surrounds the exterior circumferential surface of laminated stack 31 of rotor assembly 15, which is disposed axially between a first annular end plate 41 and a second annular end plate 43.

As illustrated in FIG. 1, first annular end plate 41 is restrained in the axial x-x direction between lamination stack 31 and first axial restraining elements 40a-40f of spacers 20a-20f, respectively. First axial restraining elements 40a-40f extend from a distal axial edge of each spacer 20a-20f, proximate to first end 18 of center shaft 16, in an outward radial direction beyond an inner circumferential surface of first annular end plate 41, such that first annular end plate 41 is restrained from moving any farther in the x-x direction towards first end 18. It can be appreciated that second annular end plate 43 is also constrained by corresponding second axial restraining elements 42a-42f (not shown), as is discussed below in further detail.

First and second annular end plates 41, 43 serve a number of purposes, as is further discussed below, including helping to balance rotor assembly 15 during operation. First and second annular end plates 41, 43 preferably comprise a plurality of mounting holes 48, to which one or more optional balancing weights 46 may be attached. The use of any such combination of balancing weight 46 and mounting holes 48 may depend on calibration testing performed on a fully assembled rotor 15.

Figure 2:
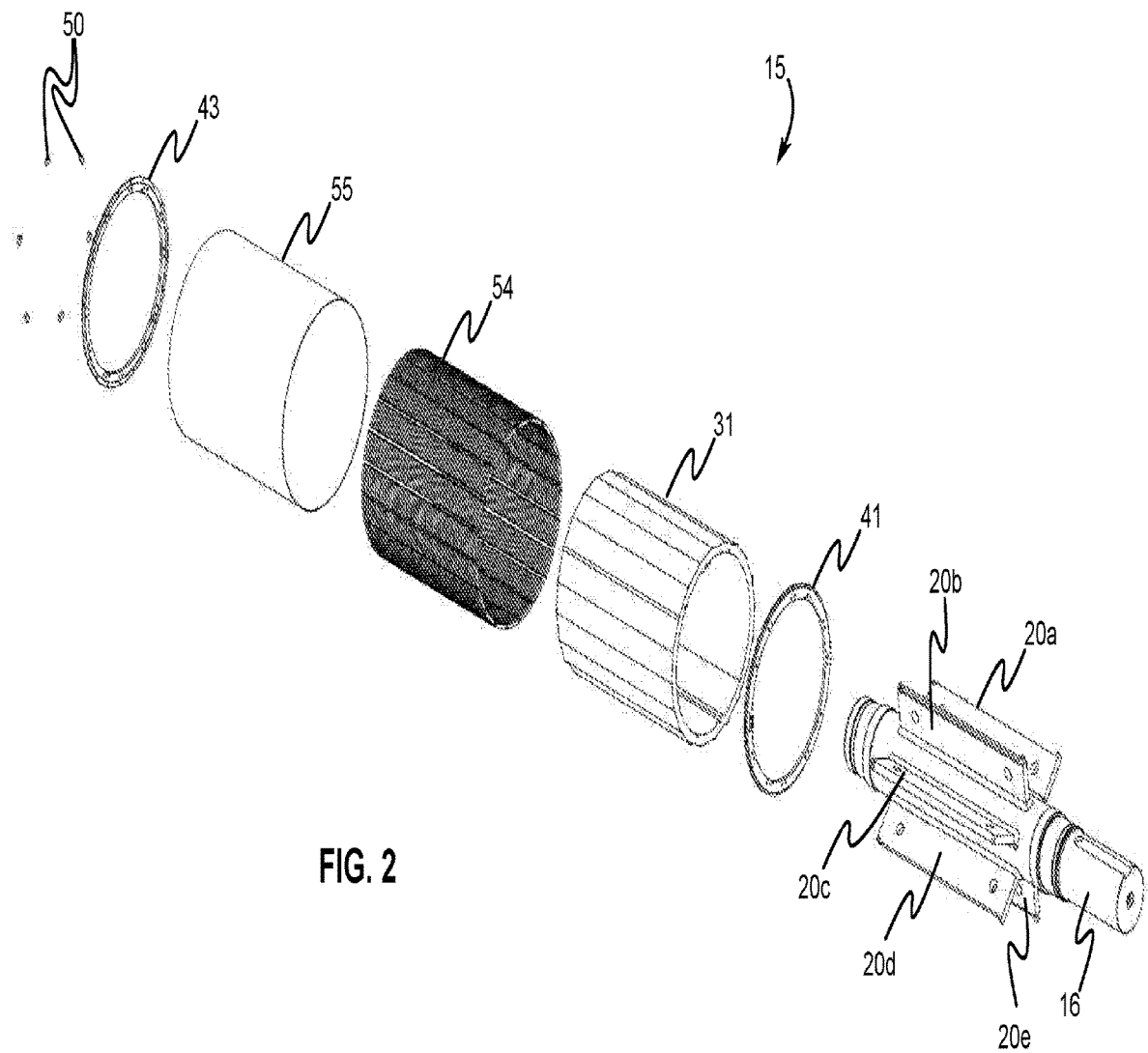
FIG. 2 is an exploded view of the rotor assembly of FIG. 1.

Turning to FIG. 2, illustrated is an exploded view of rotor assembly 15. Center shaft 16 and spacers 20a-20f are preferably fixedly attached to each other, forming a single, unitary structure. FIG. 2 further shows first and second annular end plates 41, 43, in addition to outer band 55, as described with reference to FIG. 1. The exploded nature of FIG. 2 also reveals lamination stack 31, segmented magnets 54, and restraining keys, severally indicated at 50, which were not visible in FIG. 1.

Lamination stack 31 is comprised of a plurality of individual thin annular laminations (see FIG. 4), axially stacked and coaxially aligned with center shaft 16, and radially supported by spacers 20a-20f. A plurality of segmented magnets, severally indicated at 54, are attached to an outer circumferential surface of lamination stack 31. Segmented magnets 54 are preferably glued to lamination stack 31, and are further secured in place by outer band 55. Restraining keys 50 comprise a portion of second axial restraining element 42 (not shown), as is discussed below in further detail.

Figure 3:
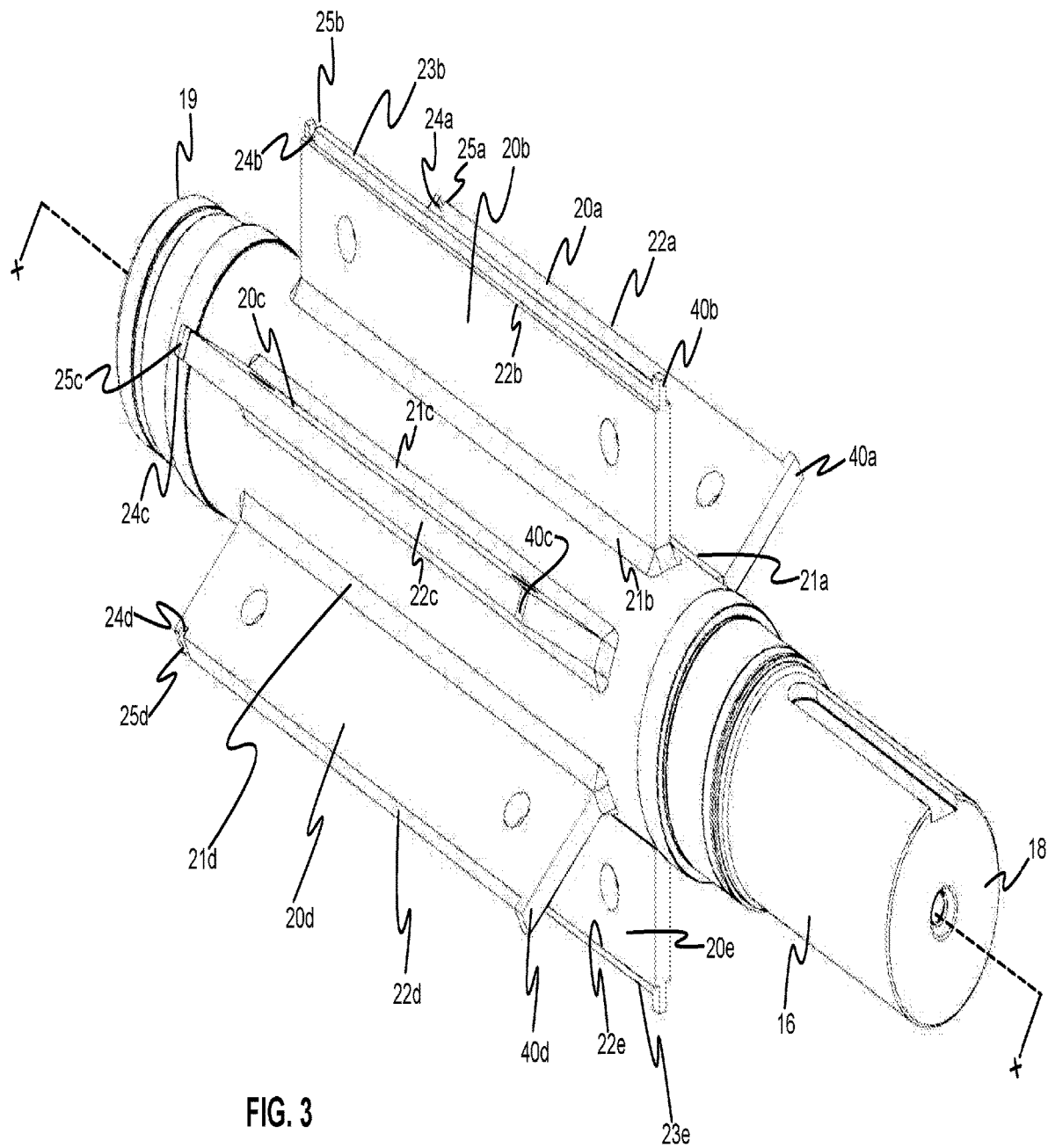
FIG. 3 is a perspective view of the center shaft with plurality of spacers of FIG. 1.

FIG. 3 illustrates a perspective view of center shaft 16 and plurality of spacers 20a-20f. Shaft 16 is preferably a solid cylindrical member orientated about central longitudinal axis x-x. Each spacer 20a-20f is welded using submerged arc welding directly to center shaft 16 along axially extending proximal edge 21 extending substantially along axis x-x. As illustrated, six spacers 20a-20f, in the form of ribs or spokes, are circumferentially spaced symmetrically around center shaft 16 and extend radially from center shaft 16. Each spacer 20a-20f extends radially outward away from center shaft 16 to distal edge 22, also extending substantially along axis x-x.

Spacers 20a-20f are sized, shaped, and positioned to minimize inertia but distribute stresses evenly. While ribs are shown, spacers 20a-20f can take on various shapes and sizes, such as rectangular, trapezoidal, curved, etc. depending on the requirements of the particular rotor. It is desired that rotor assembly be designed with a minimal number of ribs having the smallest size that can withstand the highest required torque transmission, both for low cycle fatigue and high cycle fatigue, and be shaped such that inertia can be minimized and stress and be evenly distributed.

Spacers 20b and 20e have, adjacent to distal edge 22, a first coupling element 23. In this embodiment, first coupling element 23 comprises protrusions 23b and 23e extending radially from the distal ends of spacers 20b and 20e. Protrusions 23b, 23e are configured to mate with a corresponding second coupling element 32 in each annular lamination 30 (not shown), which in this embodiment comprises a slot. While coupling elements 23b and 23e are shown to be axially extending protrusions and coupling elements 32b and 32e are corresponding slots or grooves, it is appreciated that any number or type of coupling mechanism or combinations of elements can be used to mechanically engage spacers 20a-20f with each annular lamination 30. Spacers 20a-20f are each shown with first axial restraining element 40a-40f, respectively, on axially extending distal edge 22a-22f and proximate first end 18 of center shaft 16.

As further described below, axially extending distal edges 22b and 22e of at least two opposed spacers 20b and 20e include axially-extending keys or protrusions 23b, 23e that are configured to be received in a corresponding axially-extending inwardly-facing radially-open key slot or groove 32b, 32e formed in inner circumferential surface 33 of laminated stack 31.

FIG. 3 shows spacers 20a-20f as having, on distal edges 22a-22f and proximate second end 19 of center shaft 16, a transversely extending recess 24a-24f having a recess entrance 25a-25f, respectively. Each recess 24a-24f combines with a corresponding restraining key 50 (as shown in FIG. 2) to form second axial restraining elements 42a-42f (not shown), as discussed below in further detail.

Figures 4, 5:
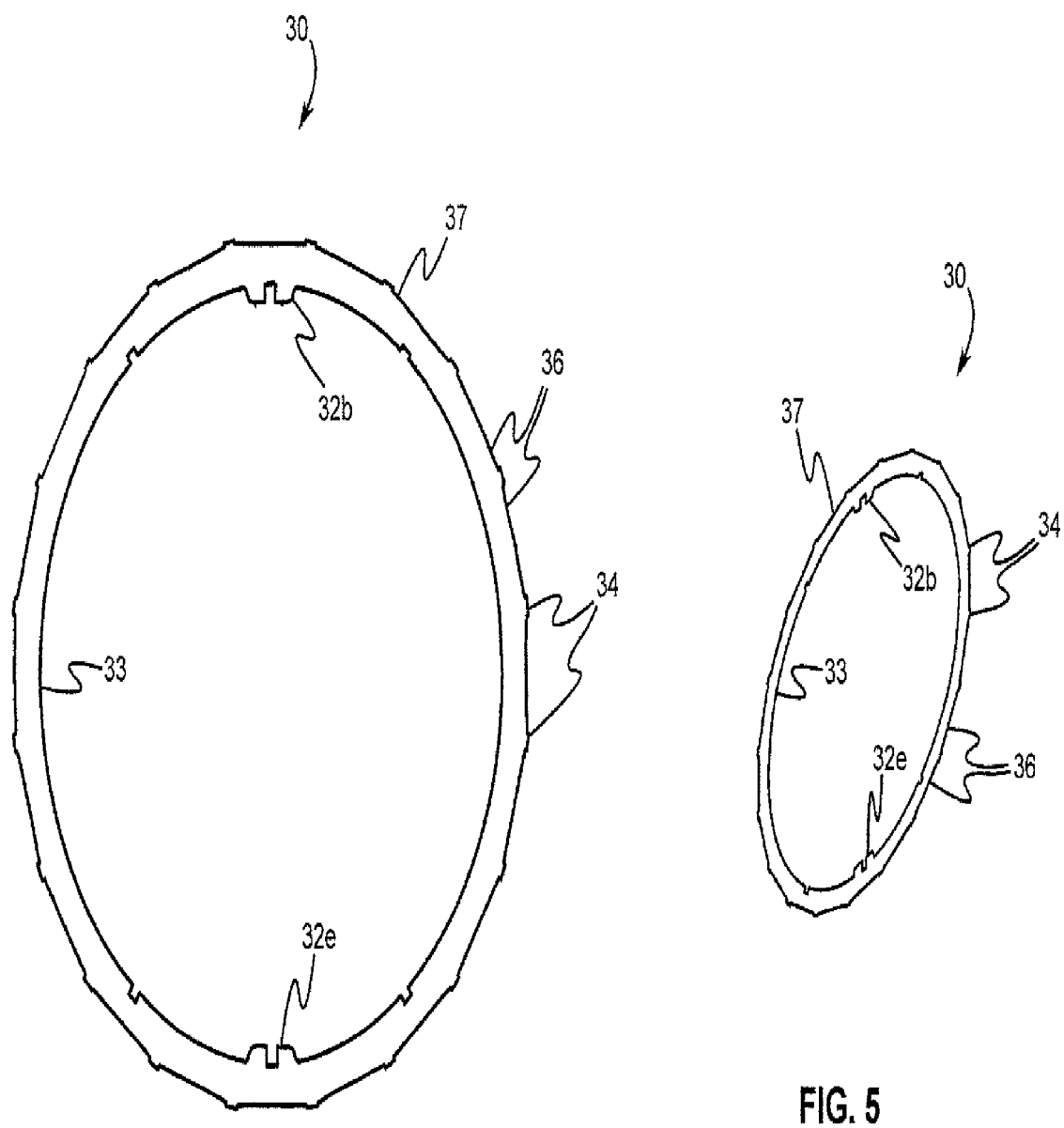
FIG. 4 is an elevation view of an annular lamination of FIG. 1.
FIG. 5 is a perspective view of the annular lamination of FIG. 4.

Turning to FIGS. 4 and 5, illustrated are views of an individual annular lamination 30, according to a preferred embodiment of the disclosure. Annular lamination 30 is preferably formed from a thin annular electrical steel laminate, about 0.55 mm in thickness. Annular lamination 30 is generally defined by an outer circumferential cylindrical surface 37 and an inner circumferential cylindrical surface 33.

Within inner circumferential surface 33 is at least one groove 32b, 32e, which is configured to mechanically receive protrusion 23 of each of spacers 20b, 20e. Laminated stack 31 is preferably formed from a multiplicity of stacked laminate layers or rings 30. For example, a medium stack length of rotor 15 may be 1400 individual laminate layers 30. In a preferred embodiment, each annular laminate layer 30 of the stack includes at least two grooves 32b, 32e, indicated as opposed radially-open slots for receiving respective keys 23b, 23e of the corresponding opposed spacers 20b, 20e. Additional first and second coupling elements are primarily provided to allow for variations machining processes, whereby the mating of one set of the coupling elements might not be exactly aligned.

Annular lamination 30 is further shown having, on outer circumferential surface 37, a plurality of protrusions 34 defining a plurality of slots 36 there between. The spacing between protrusions 34, and as a result the size of slots 36, corresponds to the width of segmented magnets 54 (not shown), such that segmented magnets 54 fit snugly within longitudinally or axially extending channels formed when a plurality of annular laminations 30 are axially stacked together over spacers 20a-20f, as is further discussed below.

Figure 6:
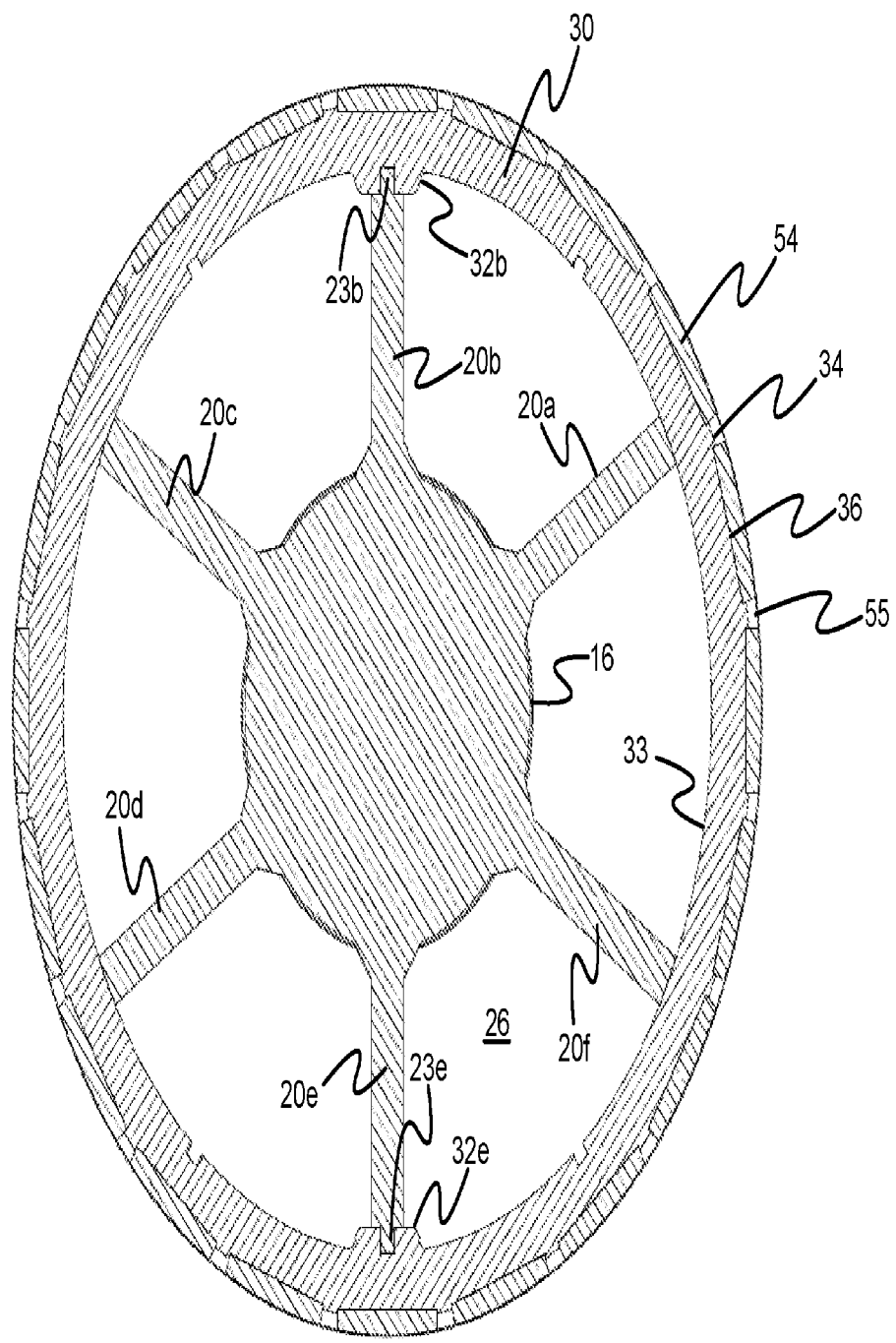
FIG. 6 is a transverse cross sectional view of the rotor assembly of FIG. 1, taken from the middle of the center shaft.

FIG. 6 is a transverse cross sectional view of rotor assembly 15, taken from the middle of center shaft 16. In a preferred embodiment, a plurality of annular laminations 30 are heated, then axially stacked directly over spacers 20a-20f, such that annular laminations 30 are coaxially aligned with center shaft 16 and are radially supported by plurality of spacers 20a-20f. Protrusions 23b, 23e of spacers 20b, 20e as received in corresponding grooves 32b, 32e of each annular lamination 30, wherein rotational movement of each annular lamination about longitudinal axis x-x (see FIG. 7) relative to center shaft 16 is restrained by protrusions 23b, 23e in grooves 32b, 32e of stack 31.

FIG. 6 further illustrates that plurality of spacers 20a-20f are preferably axially elongated radial spokes welded directly to center shaft 16, and that annular laminations 30 contact spacers 20a-20f directly, without any intervening shroud or sleeve disposed in between. Spacers 20a-20f are preferably circumferentially spaced symmetrically around center shaft 16, such that voids, severally indicated at 26, are defined within the spaced demarcated by two adjacent spacers, such as spacers 20a and 20b, center shaft 16, and inner circumferential surface 33 of annular laminations 30.

FIG. 6 additionally illustrates a plurality of segmented magnets 54 disposed circumferentially around outer surface 37 of annular lamination 30 within each magnet slot 36 defined between each lamination protrusion 34. Segmented magnets 54 are preferably glued to channels formed by stacked magnet slots 36 on outer circumferential surface 37 of annular lamination 30, and segmented magnets are further secured to outer circumferential surface 37 of annular lamination 30 by outer band 55. While axially extending segmented magnets are preferred, it is appreciated that other types of magnets, such as annular magnets, can be used.

Outer band 55 is preferably a fiberglass band, which is applied over magnets 54 and then cured, which helps to avoid magnets 54 flying off during the operation of rotor assembly 15 due to poor bonding of segmented magnets 54 to laminated stack 31. While fiberglass is a preferred material, any other type of strong, flexible, non-magnetic material can be used.

Figure 7:
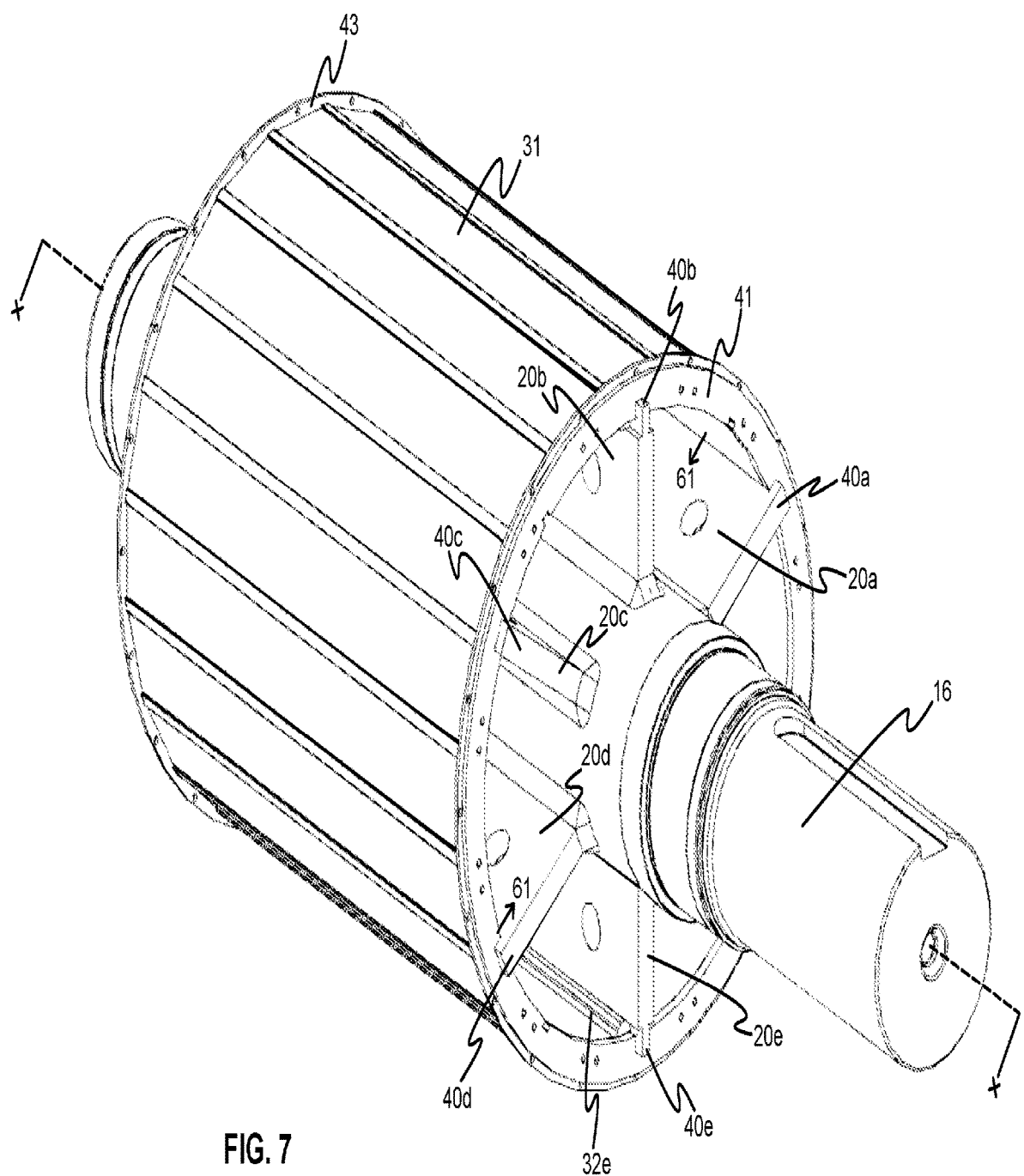
FIG. 7 is a perspective view of a plurality of stacked annular laminations and end plates engaged with a center shaft and a plurality of spacers of FIG. 1.

As illustrated in FIG. 7 and discussed with reference to FIG. 6 above, plurality of annular laminations 30 are axially stacked over spacers 20a-20f, thus forming annular lamination stack 31. Stack 31 appears in FIG. 7 to have a smooth, continuous outer surface due to the extreme thinness (approximately 0.55 mm) of each individual laminate 30. Annular lamination stack 31 is coaxially aligned with center shaft 16 and is radially supported by plurality of spacers 20a-20f. In a preferred embodiment, since each annular lamination 30 is heated prior to forming stack 31, annular lamination stack 31 is shrink fit to spacers 20a-20f, such that annular lamination stack 31 exerts an inward radial compression force along arrows 61. Further, annular lamination stack 31 is preferably compressed axially in the x-x direction between first and second annular end plates 41, 43, with annular end plates 41, 43 being constrained in the axial x-x direction by tabs 40a-40f and recesses/keys 42a-42f (not shown).

A small clearance is provided between keys 23b, 23e of respective spacers 20b, 20e and key slots 32a, 32e of laminated stack 31, and an interference fit is formed between inner diameter 33 of laminated stack 31 and distal ends 22b, 22e of spacers 20b, 20e. Thin annular laminations 30 are heated during assembly as they are stacked around spacers 20a-20f such that when they cool stack 31 shrinks to fit directly on to rotor spacers 20a-20f. Given the elasticity of laminations 30, a force or load is thereby applied radially inwardly on spacers 20a-20f. There is no additional welded metal structural ring or sleeve between laminated stack 31 and spacers 20a-20f. Laminated stack 31 is shrink-fit directly to spacers 20a-20f. This provides a lower mass rotor and better magnetic permeability.

During assembly, center shaft 16 is preferably orientated vertically with the drive end down. First end plate 41 is placed around spacers 20a-20f and down against the upwardly facing retaining surfaces of tab elements 40a-40f, which are preferably in the form of rib projections or tabs, as illustrated. Thin annular steel laminates 30 of stack 31 are heated and then dropped and stacked on each other around spacers 20a-20f, with a bottom annular end face of a first laminate bearing against an inner annular end face of first end plate 41. Once stack of laminates 31 has reached a desired height, second annular end plate 43 is placed on top and is pressed down against stacked laminate layers 31 and first end plate 41 and first axial restraining elements 40a-40f, to thereby axially load laminated stack 31 to a desired stack pressure. This stack pressure in then maintained via second axial restraining elements 42a-42f.

Figure 8:
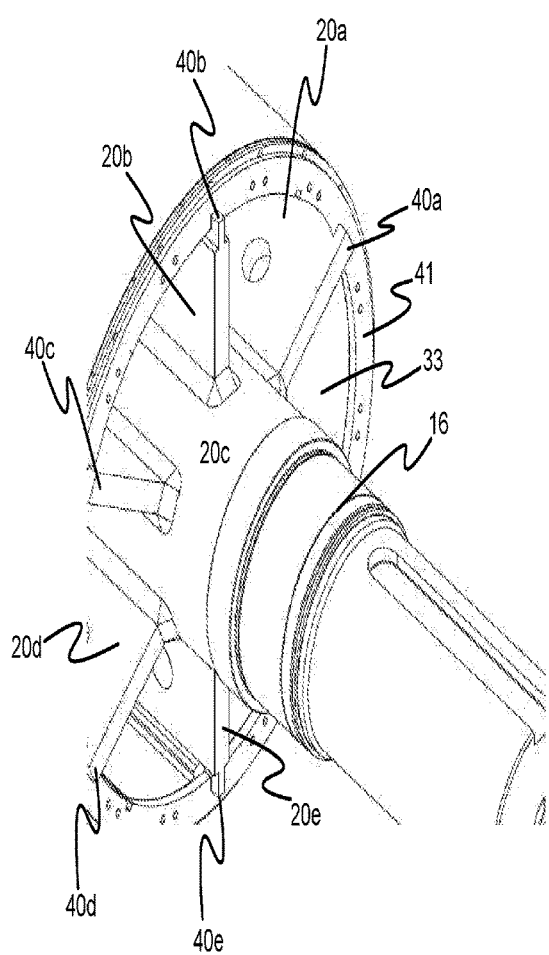
FIG. 8 is an enlarged fragmentary view showing an axial restraining element of FIG. 1.
Figure 9:
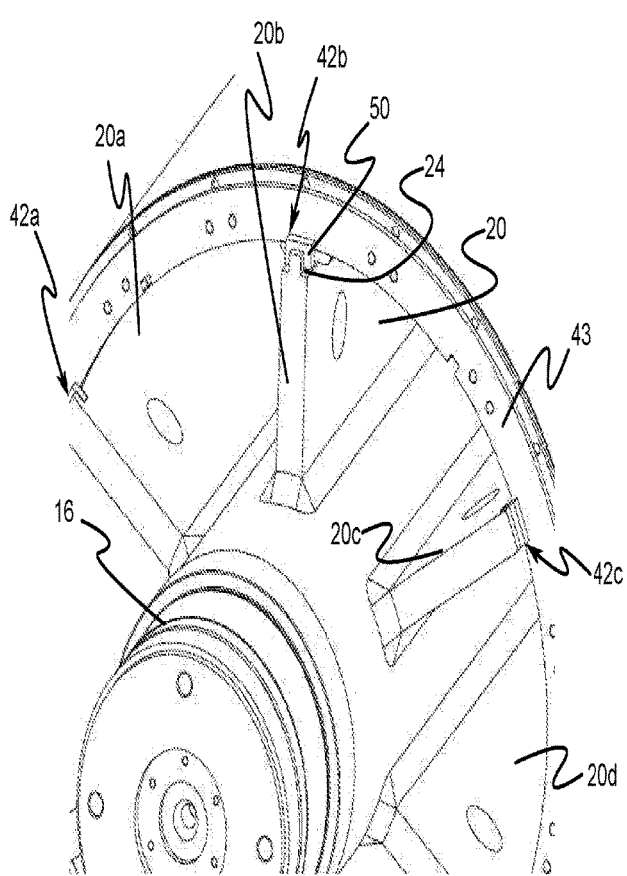
FIG. 9 is an enlarged fragmentary view showing an alternative axial restraining element of FIG. 1.

FIGS. 8 and 9 illustrate enlarged fragmentary views of first and second restraining elements 40 and 42. In FIG. 8, first annular end plate 41 is engaged with restraining tabs 40a-f. In this instance, first restraining elements 40a-40f take the form of restraining tabs extending from respective distal edges 22a-22f at a first end of each spacer 20a-20f in an outward radial direction beyond inner circumferential surface 33 of plurality of stacked annular laminations 31. In FIG. 9, second annular end plate 42 is engaged with restraining recesses/keys 42a-42f. In this instance, each second restraining element 42a-42f comprises transversely extending recesses severally indicated at 24 within respective distal edges 22a-22f at a second end of each spacer 20a-20f, combined with restraining keys 50 at least partially supported within recesses 24 and also extending in an outward radial direction beyond inner circumferential surface 33 of lamination stack 31. While tabs, recesses, and keys are used as restraining elements in the instant embodiment, it is envisioned that any suitable element(s) for similarly axially restraining annular end plates 41 and 43 may be used.

With further reference to FIG. 9, in a preferred embodiment of the disclosure, distal edges 22a-22f of spacers 20a-20f on second end 19 of shaft 16 each include a transversely-extending outwardly facing radially-open key slot or recess 24 configured to receive transversely extending keys or restraining elements 50 that will constrain an outer annular end face of a non-drive end of second end plate 43. When a desired stacking pressuring has been applied to laminated stack 31 as described above, restraining key or element 50 is placed in transversely-extending radially-open key slot or recess 24, with a portion extending radially beyond an inner diameter of second end plate 43 and laminated stack 31. Restraining key 50 is then fixedly attached into place, preferably by welding restraining key 50 to both recess 24 and to second end plate 43. Such restraining element 42 constrains axial movement of laminated stack 31 in a direction toward second end 19 along central axis x-x of shaft 16. A thickness of restraining element 50 may be adjusted to maintain the desired axial stack pressure. In this manner, laminated stack 31 is axially compressed between end plates 41, 43 and a compression stress on laminations 31 is thereby provided.

Figure 10:
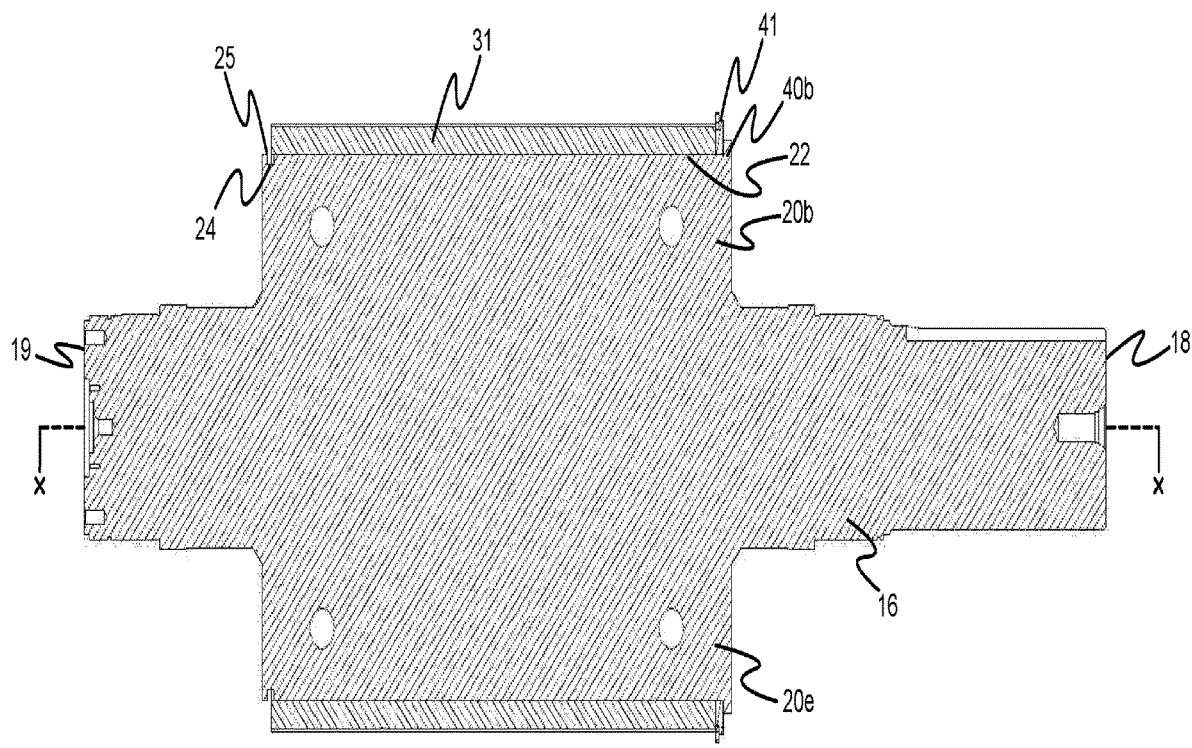
FIG. 10 is an axial cross sectional view of the rotor assembly, taken through the center shaft and a plurality of spacers, in an uncompressed lamination stack configuration.

A method of fabricating rotor assembly 15 of an electric motor is now described with reference to FIGS. 10-12, which illustrate axial cross sectional views of multiple embodiments of rotor assembly 15, taken through the center shaft 16 and a plurality of spacers 20b, 20e. As shown in FIG. 10, center shaft 16 is provided with a plurality of spacers 20a-20f fixedly attached to center shaft 16, wherein center shaft 16 and spacers 20a-20f preferably form a single integrated structure. Spacers 20a-20f extend radially outward from center shaft 16. A plurality of annular laminations 30 are provided. In one embodiment, axially extending distal edges 22a-22f of at least one of spacers 20a-20f is provided with an axially extending first coupling element 23b, 23e, and each of said annular laminations 30 are provided with second coupling element 32b, 32e formed within inner circumferential surface 33 of each annular lamination 30, as described hereinabove.

First axial restraining element 40a-40f of each spacer 20a-20f is provided on axially extending distal edge 22a-22f of each spacer 20a-20f and proximate first end 18 of center shaft 16. First axial restraining element 40a-40f is further provided extending in an outward radial direction beyond inner circumferential surface 33 of each annular lamination 30. Next, first annular end plate 41 is placed over spacers 20a-20f, such that first annular end plate is aligned coaxially with center shaft 16.

Each annular lamination 30 is then heated. After the placing of first annular end plate 41, the heated annular laminations 30 are axially stacked over spacers 20a-20f such that annular lamination stack 31 is formed and is coaxially aligned with center shaft 16. First coupling element 23b, 23e of spacer 20b, 20e is engaged with second coupling element 32b, 32e of each annular lamination 30 such that rotational movement of annular lamination stack 31 about longitudinal axis x-x relative to center shaft 16 is restrained. At this stage, annular lamination stack 31 is uncompressed. As illustrated in FIG. 10, uncompressed lamination stack 31 extends axially beyond recess entrance 25 of transversely extending recess 24 of spacer 20. In one embodiment, recess 24 measures approximately 10 mm in the axial direction.

Figure 11:
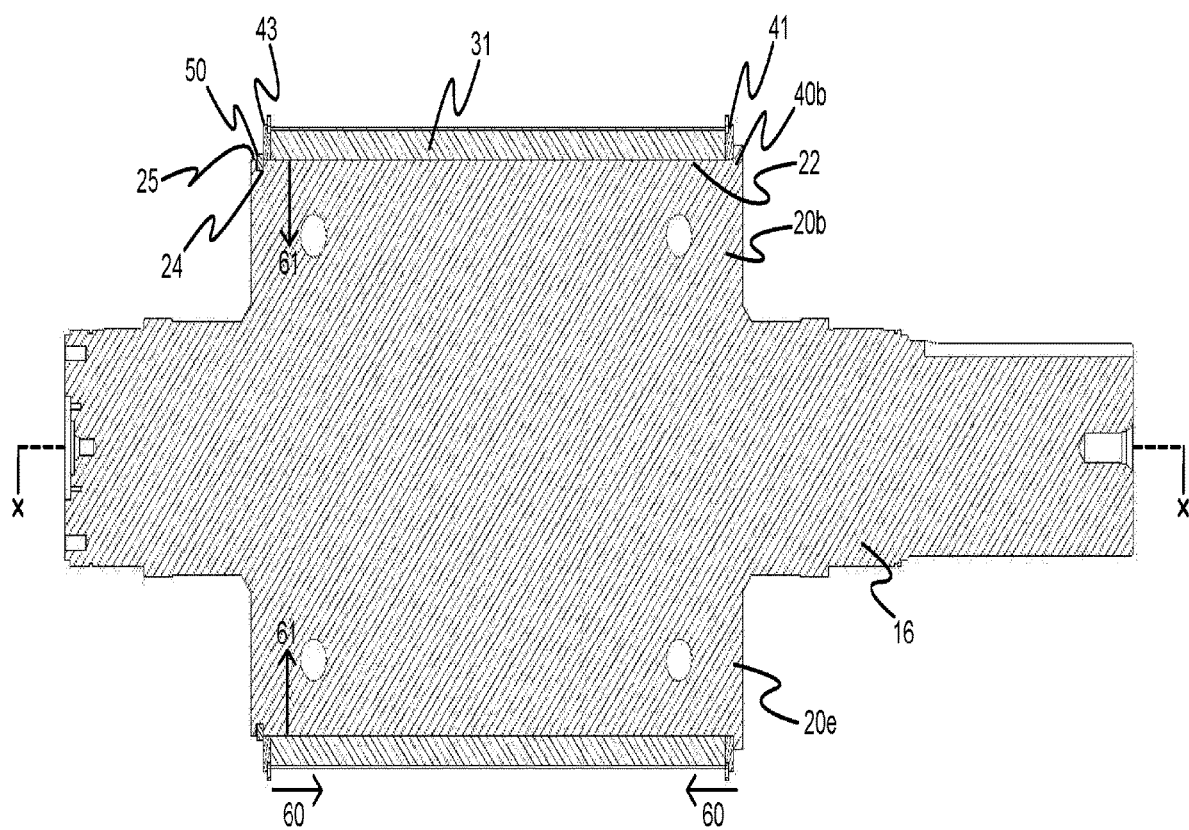
FIG. 11 is an axial cross sectional view of a rotor assembly of FIG. 10 in a compressed and restrained lamination stack configuration.

Turning to FIG. 11, after annular lamination stack 31 is assembled over spacers 20a-20f and is in an uncompressed state, second annular end plate 43 is then placed over spacers 20a-20f. After the placing of second annular end plate 43, lamination stack 31 is axially compressed between first annular end plate 41 and said second annular end plate 43, such that axial compression force 60 is applied to annular lamination stack 31.

Next is provided second axial restraining element 42a-42f, comprising restraining keys 50 and recesses 24. Restraining keys 50 are engaged with recesses 24 and second annular end plate 43 such that axial compression force 60 applied to stacked annular laminations 31 is maintained. Further, because lamination stack 31 was shrink fit directly to plurality of spacers 20a-20f, lamination stack 31 exerts an inward radial force 61 towards center shaft 16. The combination of inward radial force 61 and axial compression force 60 allows for the plurality of annular laminations 30 of lamination stack 31 to be held together without the need for glue, welding, or any other bonding agent. In one embodiment, each restraining key 50 is manufactured after lamination stack 31 is compressed, so that each restraining key 50 can be made to be the exact size needed. For example, if recess 24 measures approximately 10 mm in the axial direction, and compressed lamination stack 31 extends in the axial direction 4 mm over the top of recess entrance 25 and leaving a 6 mm open gap over recess 24, then restraining key 50 can then be manufactured to have a thickness of 6 mm, so that the open gap is completely filled and the desired compression force of stack 31 is maintained.

Figure 12:
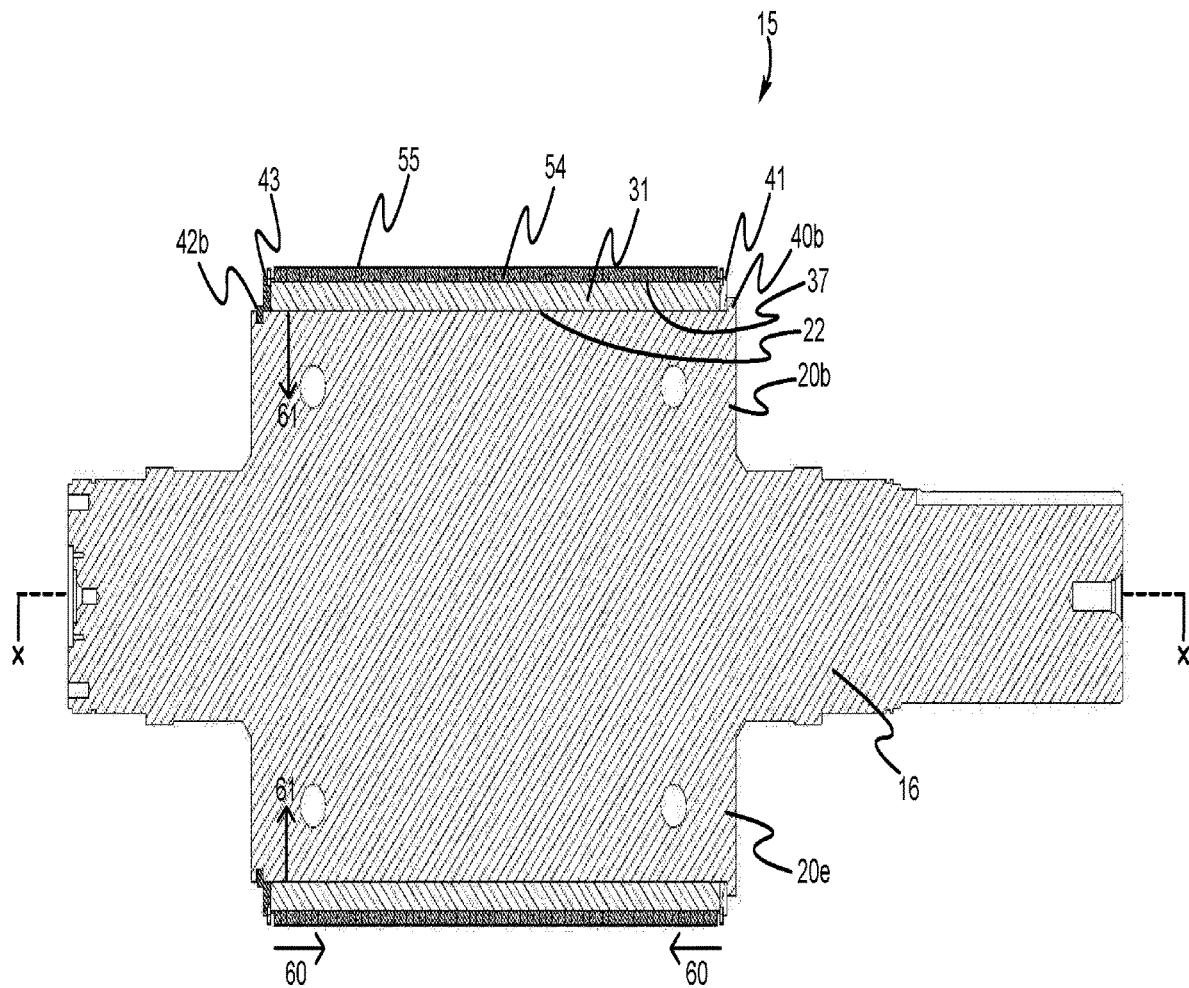
FIG. 12 is an axial cross sectional view of FIG. 11, and further showing a plurality of segmented magnets and an outer band.

Continuing the method of fabricating rotor assembly 15 of an electric motor with reference to FIG. 12, after second axial restraining element 42a-42f is secured, plurality of segmented magnets 54 are preferably glued to outer circumferential surface 37 of lamination stack 31. To further secure plurality of segmented magnets 54 to outer circumferential surface 37 of lamination stack 31, outer band 55 is applied to rotor assembly 15, covering the entirety of an outer surface of segmented magnets 54. A surface mounted permanent magnet rotor design with low inertia is thus achieved. In particular, the rotor assembly reduces material requirements, rotor weight and operational inertia, while maintaining required structural integrity.

The present invention contemplates that many changes and modifications may be made. Therefore, while the presently-preferred form of the rotor has been shown and described, and several modifications and alternatives discussed, persons skilled in this art will readily appreciate that various additional changes and modifications may be made without departing from the scope of the invention, as defined and differentiated by the following claims.

What is claimed is:

1. A method of fabricating a rotor assembly of an electric motor comprising the steps of:
    providing a center shaft having a first end and an opposing second end, said center shaft configured to rotate about a longitudinal axis;
    fixedly attaching a plurality of spacers to said center shaft along axially extending proximal edges of said plurality of spacers, such that said spacers extend radially outward from said center shaft;
    providing an axially extending distal edge of at least one of said spacers with an axially extending first coupling element;
    providing a plurality of annular laminations;
    providing each of said annular laminations with a second coupling element formed within an inner circumferential surface of said annular lamination;
    providing a first axial restraining element on said axially extending distal edge of said spacers and proximate said first end of said center shaft,
    providing said first axial restraining element extending in an outward radial direction beyond an inner circumferential surface of said plurality of annular laminations,
    placing a first annular end plate over said spacers,
    aligning said first annular end plate coaxially with said center shaft;
    heating said annular laminations;
    after said placing of said first annular end plate, axially stacking said heated annular laminations over said spacers such that said annular laminations are coaxially aligned with said center shaft;
    engaging said first coupling element of said spacer with said second coupling element of said annular laminations such that rotational movement of said stacked annular laminations about said longitudinal axis relative to said center shaft is restrained;
    after said stacking of said annular laminations, placing a second annular end plate over said spacers;
    after said placing of said second annular end plate, axially compressing said stacked annular laminations between said first annular end plate and said second annular end plate, such that an axial compression force is applied to said stacked annular laminations;
    providing a second axial restraining element extending in an outward radial direction beyond said inner circumferential surface of said stacked annular laminations; and
    engaging said second axial restraining element with said second annular end plate such that said axial compression force applied to said stacked annular laminations is maintained.

2. The method of fabricating a rotor assembly of an electric motor of claim 1, further comprising the step of forging said plurality of spacers together with said center shaft to provide a single unitary structure.

3. The method of fabricating a rotor assembly of an electric motor of claim 1, further comprising the step of spacing said plurality of spacers circumferentially and symmetrically around said center shaft.

4. The method of fabricating a rotor assembly of an electric motor of claim 1, further comprising the steps of:
    providing a plurality of axially extending segmented magnets;
    attaching said segmented magnets to an outer surface of said stacked annular laminations;
    circumferentially wrapping said plurality of segmented magnets with an outer flexible band;
    curing said rotor assembly such that said outer flexible band fixedly secures said segmented magnets to said stacked annular laminations.

5. The method according of fabricating a rotor assembly of an electric motor of claim 1, wherein said plurality of spacers comprise axially elongated radial spokes welded to said center shaft.

6. The method according of fabricating a rotor assembly of an electric motor of claim 1, wherein said plurality of spacers are circumferentially spaced symmetrically around said center shaft.

7. The method according of fabricating a rotor assembly of an electric motor of claim 1, wherein said first coupling element comprises an axially elongated protrusion or groove, and wherein said second coupling element comprises the other of a protrusion or a groove configured to mate with said first coupling element.

8. The method according of fabricating a rotor assembly of an electric motor of claim 1, wherein said distal edge of at least two of said plurality of spacers each having said axially extending first coupling portion, and wherein each of said plurality of stacked annular laminations having a plurality of second coupling portions configured to engage with said at least two first coupling portions.

9. The method according of fabricating a rotor assembly of an electric motor of claim 1, wherein said stacked annular laminations are in direct contact with said spacers.

10. The method according of fabricating a rotor assembly of an electric motor of claim 1, wherein said stacked annular laminations are shrink fit to said spacers.

11. The method according of fabricating a rotor assembly of an electric motor of claim 1, wherein an external bonding agent is not used to join together each of said stacked annular laminations.

12. The method according of fabricating a rotor assembly of an electric motor of claim 1, wherein said first axial restraining element comprises a transversely extending recess having a recess entrance in said distal edge of at least one of said spacers; and a restraining key partially supported in said recess and extending in an outward radial direction beyond said recess entrance and said inner circumferential surface of said stacked annular laminations.

13. The method according of fabricating a rotor assembly of an electric motor of claim 12, wherein said restraining key has a length and a thickness that varies with said length such that said axial compression force of said plurality of stacked laminations can be selectively varied as a function of said length of said restraining key supported in said recess.

14. The method according of fabricating a rotor assembly of an electric motor of claim 1, wherein said second axial restraining element comprises a restraining tab extending from at least one of said spacers in an outward radial direction beyond said inner circumferential surface of said stacked annular laminations.

* * * * *